US000001104H

United States Statutory Invention Registration [19]

[11] Reg. Number: H1104

Cavanagh

[43] Published: Sep. 1, 1992

[54] AIR CUSHION VEHICLE CONDUCTIVE/SEMICONDUCTIVE FLEXIBLE SKIRT, AND METHOD

[75] Inventor: Richard A. Cavanagh, Panama City, Fla.

[73] Assignee: The United States of America as represented by the Secretary of the Navy, Washington, D.C.

[21] Appl. No.: 487,489

[22] Filed: Mar. 2, 1990

[51] Int. Cl.[5] ..... B32B 7/00; B32B 15/00; D03D 9/00; D04B 1/00

[52] U.S. Cl. ..... 428/256; 428/225; 428/285; 428/922; 428/929; 428/902

[58] Field of Search ..... 180/127; 428/225, 256, 428/285, 922, 929

[56] References Cited

U.S. PATENT DOCUMENTS

| | | | |
|---|---|---|---|
| 3,643,757 | 2/1972 | Delamare | 180/127 |
| 3,726,493 | 4/1973 | Muller | 244/2 |
| 3,866,707 | 2/1975 | Paoli | 180/127 |
| 3,875,856 | 4/1975 | Meeker | 104/23 FS |
| 3,877,542 | 4/1975 | Paoli | 180/127 |

FOREIGN PATENT DOCUMENTS 2-46697 2/1990 Japan .

*Primary Examiner*—Brooks H. Hunt
*Assistant Examiner*—Daniel J. Jenkins
*Attorney, Agent, or Firm*—John E. Becker; Sol Sheinbein; William Cecil Townsend

[57] ABSTRACT

A method for dissipating static electrical energy from air cushion vehicles when operating more particularly in cold, low humidity environments, which method involves fabricating the skirt assembly from a flexible sheet material of at least semiconductive character which will provide a suitable dissipating grounding pathway to discharge potential static electrical energy generated during the aforesaid operation thereof. The method includes utilizing a coated flexible fabric material having at least one of its opposite surfaces coated with an elastomeric abrasion-resistant material, and embedding a plurality of electrically conductive flexible strands at least partially within said flexible fabric material, or alternatively embedding electrically conductive particles or fibers in a generally uniformly manner throughout a forming of its elastomeric composition. The invention also is directed specifically to an air cushion vehicle skirt component comprised of electrically conductive composite flexible sheet material having sufficient conductive characteristics to provide a near constant dissipation grounding pathway from said vehicle for any substantial build up of generated static electrical energy, more particularly when the air cushion vehicle is operating in cold, low humidity environments.

7 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

AIR CUSHION VEHICLE CONDUCTIVE/SEMICONDUCTIVE FLEXIBLE SKIRT, AND METHOD

GOVERNMENT INTEREST STATEMENT

The invention described herein may be manufactured and used by or for the Government of the United States of America for government purposes without the payment of any royalties thereon or therefore.

BACKGROUND OF THE INVENTION

This invention relates generally to air cushion vehicles and more specifically to the fabrication of electrically conductive and semiconductive flexible skirts that are used to form the primary or basic air cushion peripheral sealing means.

Whether the air cushion vehicle is of the fully skirted type or of a sidewall type in which the air cushion containment is effected by a combination of rigid side walls and bow and stern flexible skirts, the skirt materials have frequently been fabricated of a very durable fabric, which is preferably coated or impregnated on both sides with a rubber material to provide added strength and abrasion resistance. These air cushion vehicles, more particularly when operating in cold, dry environments, are prone to a large build up of electrostatic energy, which if not timely dissipated or bled off via suitable grounding paths or circuit means, will build up to varying significant potentials which cause not only incessant nuisance arcing shocks to the crew personnel, but which also cause extensive very serious high voltage discharging shocks which impart significant damage especially to the vessel's various electrical and electronic equipment.

Static electricity is caused by concentrations of electrons in one location, and the positively charged ions in another. When the voltage potential between the two locations is sufficiently large, the current flows from one location to the other, through the air. This is normally called "arcing". The distance that the arc can jump is determined by the voltage potential. The larger the distance, the larger the charge has to be in order to jump. Conversely, at a given voltage potential, if the distance between the points decreases enough, an arc will pass.

One of the causes of static electricity is the stripping of electrons by the motion of the air. It is theorized that this situation occurs on an air cushion vehicle due at least partially to the effect of the rotating machinery. In the case of the exemplary FIG. 1 vehicle, this would be the propellers and the lift fans. Since the airflow of both of these are obstructed by the engine compartment and the lift fan solutes, the structure may also be charged by the passing air. If this is so, a charge may also be generated just by the relative motion of the craft at high airspeeds which often approaches 70 mph.

The amount of charge which is generated is unknown. It is known that static electricity buildup is a function of the temperature and humidity. A decrease in either of these will increase the rapidity of static electric buildup. This is why such vessels operating in the cold arctic environment experience the static electric problems.

While static electricity potentials are commonly dissipated from heavy highway transporting trucks via the use of trailing chains or other conductive strap members beneath the truck bodies, similar attempts with the air cushion vehicles were unsuccessful. In this regard, in addition to attaching grounding straps to various equipment and personnel, pieces of tin foil were hung in the air and a metal chain was hung overboard to drag along the ground. The only method which seemed to have any effect was that of the dragging chain. However, this did not dissipate enough of the electrical charge to stop equipment damage and personnel nuisance shocks. Moreover, such elongated straps and long chains were found to be susceptible to detrimental snagging on foliage and other ground oriented objects or obstacles.

In addition to shocks to the fingers when touching metal objects, the arcing was so bad that the headsets would arc to the crew's outer ears. This is most distracting when the crew members are trying to see through the blowing snow and darkness, and maneuver the craft. The biggest problem experienced was the discharge of static electricity causing damage to the electronic equipment. Printed circuit boards are quite damage sensitive to current shocks which pass during the discharge. These boards are not usually repairable at the local maintenance shops and have to be replaced, or the whole unit has to be sent back to the manufacturer to be repaired. The result is either a large inventory of repair parts to keep the unit serviceable, requiring additional storage space in the arctic which is a remote and logistically difficult area to support, or a large amount of downtime of equipment. Both of these options result in costly operations.

OBJECTS AND BRIEF SUMMARY OF THE INVENTION

Accordingly, it is a primary object of the invention to devise conductive and semiconductive skirts and/or finger components for air cushion vehicles which will provide effective current dissipation paths for the generated static energy before it builds up to the nuisance and damaging potential levels.

Another object is to provide such conductive skirts or skirt and finger components by integrating within their various homogeneous rubber and fabric compositions suitable forms of metallic or other equally conductive wire strands or fibers usually interwoven therewith in such a manner as to assure the desired effective dissipation of the static energy.

A further object is to fabricate some air cushion vehicle skirts of the aforedescribed character with a current conducting means homogeneously integrated within either the basic fabric, by interwoven metallic strands, or within the enveloping elastomeric composition, as by increasing carbon black content in synthetic rubber compositions or the homogeneous integration of suitable electrically conductive fibers such as carbon fibers throughout the formed sheet material from which they are fabricated.

A still further object is to devise a method for dissipating static electrical energy from air cushion vehicles by initiating a new use for some improved types of previously known electrically conductive flexible coated fabrics and other sheet goods, most of with which I am familiar have been heretofore differently used only for various articles of clothing, footware, mittens, and some limited applications for decoy representations, all of which embody or require an associated portable power supply to energize these conductive portions.

These and other objects and advantages will become more apparent from the following detailed descriptions, considered in conjunction with the following illustrative drawing figures.

DETAILED DESCRIPTION OF FIRST EMBODIMENT

Figure 1:
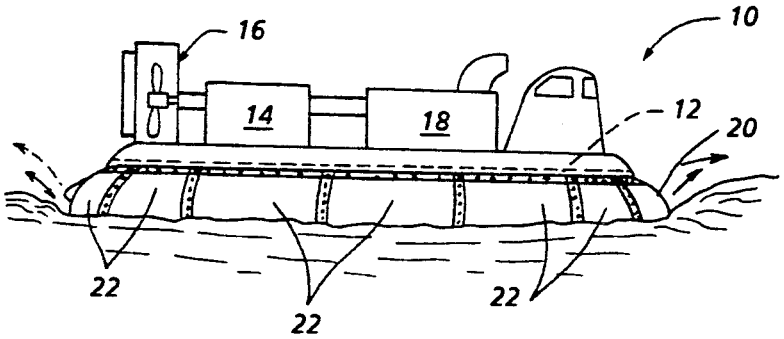
FIG. 1 is a side elevational view representative of one form of military air cushion vehicle riding on a cushion of air over a body of water.

Referring to FIG. 1, the exemplary air cushion vessel 10 will be described only in broad general terms because the invention herein is more specifically directed to the skirt member or components and the related method to be described. Vessel 10 has a customary frame and deck means 12 on which a first pair of housed engine means 14 are disposed generally toward the rearward portion and on opposite lateral sides thereof. These engines are operatively disposed to drive each of a shrouded pair of propellor means 16 which obviously serve as the craft's basic propelling means. Forwardly of said first engine means 14 are a second pair of laterally spaced second housed engine and drive means 18 in general alignment with the aforesaid engine means 14. The second engine means 18 in the form of so-called lift fans generate sufficient air power which is directed downwardly beneath said deck means to build up a powerful vessel-supporting air cushion. The air cushion is maintained and contained by a composite air cushion skirt means 20. Skirt means 20 is customarily made up of a plurality of interconnected replaceable skirt sections or components 22 which are suitably removably attached to the peripheral portion of said frame and deck means 12, and which skirt components 22 collectively form the peripheral sealing means for the developed air cushion.

Figure 2:
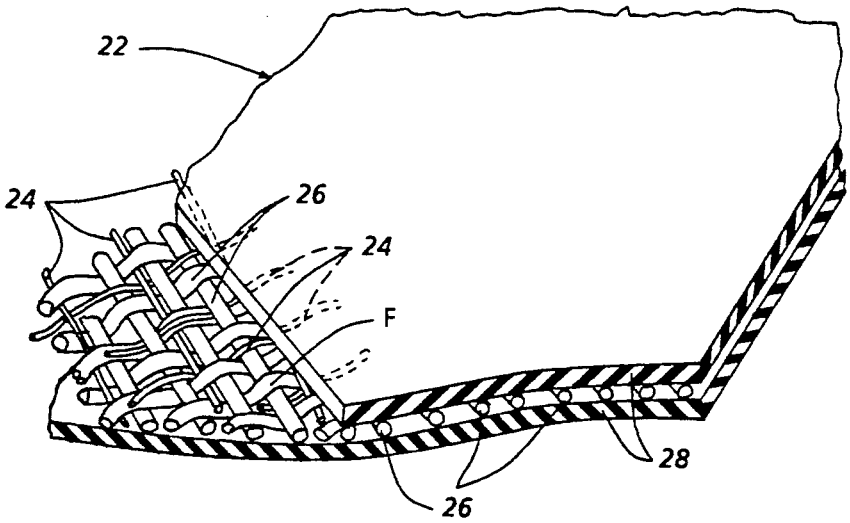
FIG. 2 is a fragmentary cross-sectional perspective view of a portion of my novel skirt member having one side partially broken away to more clearly disclose one form of electrical conductive means integrated therein.
Figure 3:
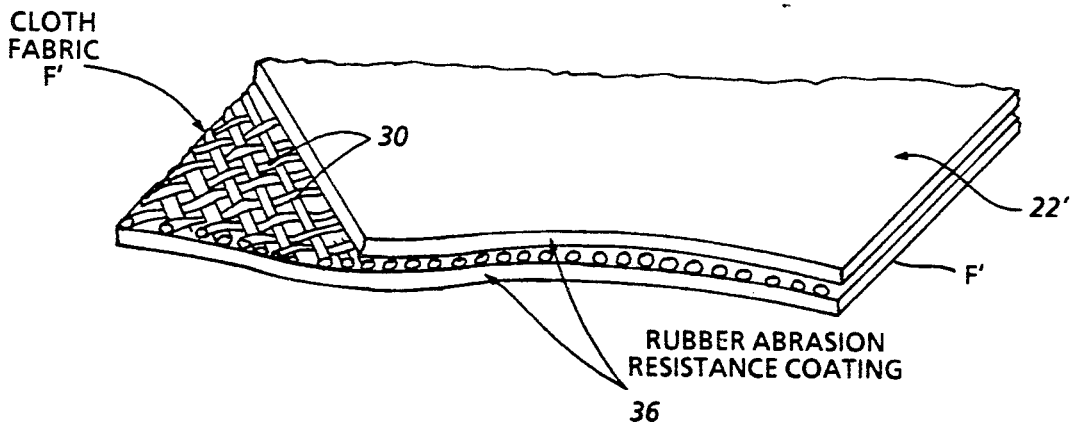
FIG. 3 is another fragmentary perspective view representative of a different embodiment having modified fabric forming strands which are better depicted in FIG. 4.

Air cushion skirt material is fabricated by using usually a woven cloth, and then coating both sides of it with rubber material, FIGS. 2 and 3. The cloth serves as the basic strength member, and the rubber provides both added strength and abrasion resistance. The normal measure of the skirt material is the weight, expressed in ounces.

The fabric is normally woven with synthetic polymer material. The size of the threads, the numbers of threads whether in groups of weft and warp cords, and the angle that the threads make with one another may vary and are specifically designed for the particular strength required.

The rubber coating is normally of either two generic types: natural or synthetic. The natural rubber offers greater resistance to cold, but the synthetic rubber offers the ability to change the rubber's abrasive resistance. A major factor in the rubber selection is it's ability to adhere to the fabric. The measurement of the quality is the peel strength of the material.

Thus in accordance with one of the objectives, this invention is directed to developing conductive and semiconductive skirt components to allow the static electrical current to flow from the hull of an air cushion vehicle or vessel down to the ground. There are two conceptual methods to develop such a skirt. One is to install a conductor or a semiconductor means in the basic fabric of the sandwiched material. The other is to change the rubber composition or coating used for sandwiching the basic fabric, by making the composition to be conductive or semiconductive.

In either case, the optimum solution would be to have a homogeneous conductive path from the entire periphery of the hull or frame to the ground, via the skirt means. The skirt would be mechanically attached to the hull, and since the conductor inside the skirt is homogeneous, the mechanical attachment would suffice for an electrical connection.

One preferred method is depicted in FIG. 2 by weaving metallic conductors 24 in with the fibers 26 of the skirt material fabric F. The conductor wires 24 could be smaller, larger, or of the same approximate diameter of the threads or of groups of threads of the material. Since the skirt is flexible, one could use a fatigue resistant soft metal, such as copper. However, the frequency of discharge of static is around one to four giga-hertz, and soft metals are not the best conductors at that frequency. A stronger metal, such as steel or a steel alloy would be a better conductor, but may tend to fatigue due to the flexing. However, a small break in the wires would be jumped by the voltage potential long before the craft built up a large enough charge to arc the distance from the hull to the ground. The fabric F is coated on both sides by the elastomeric layers 28.

MODIFIED EMBODIMENT

Figure 4:
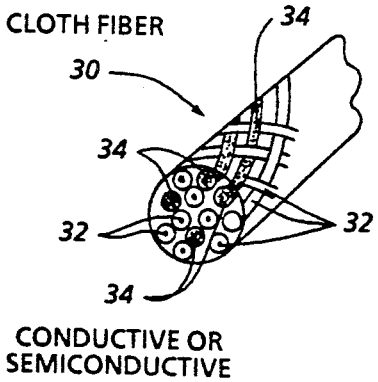
FIG. 4 is an enlarged fragmentary perspective view representative of a modified fabric strand useable as warp and weft strands in the embodiment of FIG. 3.

Another embodiment for a skirt component 22' is a variation of embedded wire conductors, as represented in FIGS. 3 and 4. FIG. 3 is similar to FIG. 2 in that the woven fabric F' may be woven of a composite fiber or groups of strands 30 as shown in FIG. 4. The strand 30 may be comprised of multiple woven finer threads 32 interwoven with at least one and preferably a plurality of conductive or semiconductive flexible strands 34. The resultant fabric F' is homogeneously coated on its opposite sides with a rubber or synthetic elastomeric coating 36 to provide abrasion resistance.

Figure 5:
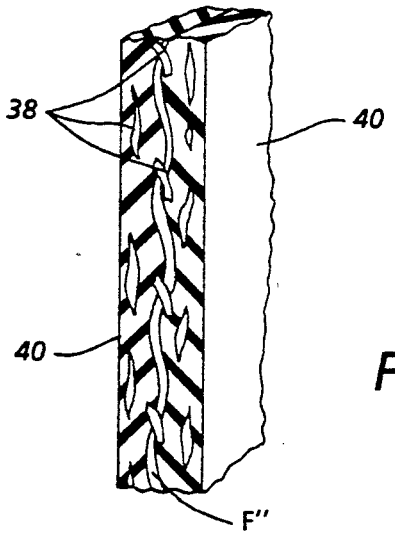
FIGS. 5 and 6 are fragmentary perspective views depicting two other contemplated forms of the electrically conductive skirt members.

Since a continuous electrical path does not have to exist through the skirt, except for high voltages, the fibers in the fabric material F'' could be semiconductors. An example of it is further modification is depicted in FIG. 5 in which carbon fibers 38 are woven into the material cloth F'' or molded into the elastomeric coating 40. A major disadvantage of the carbon fibers is that they could cause splinters and cuts to the maintenance personnel working on or around the skirts. However, from a technical viewpoint, any good semiconductor material would work.

Figure 6:
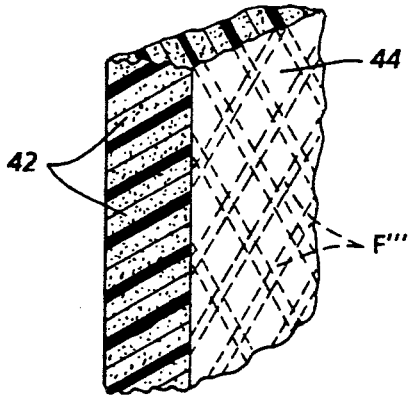

A separate approach to the conductive skirt is represented in FIG. 6, which is to increase the amount of carbon black 42 in the rubber coating 44 which envelopes the fabric F'. It is contemplated for the carbon level to be increased to an effective electrical level without incurring significant loss of structural property. This will depend upon the size of the voltage level which can be tolerated by the craft, which is dependant upon the craft on which the skirt is installed. Increasing the carbon black in synthetic rubber increases its brittleness. In fact, synthetic rubber skirts have a reputation for poor wear qualities in cold environments. Therefore, the natural rubber, which has a fixed amount of carbon in it, is the more preferred skirt material.

From the foregoing it is apparent that it is feasible for air cushion containing flexible skirts to be fabricated of a flexible conductive or semi-conductive character which satisfy the aforestated objectives and advantages hereof. From a more practical stand point it would appear that a more preferred embodiment would be that which includes weaving of more durable metallic strands, such as steel on steel alloys, into the selected fabric. In addition to providing the conductive characteristics, they would provide the secondary benefit of increased &ear resistance of the composite skirt components.

The embodiments herein before described with reference to and as shown in the accompanying drawing figures are by way of example only, and various other modifications may be made without departing from the spirit and scope of the invention as defined in the appended claims.

What is claimed is:

1. An air cushion vehicle composite flexible skirt member which forms at least a portion of peripheral sealing means for the vehicle's generated air cushion, said skirt member comprising a durable, flexible fabric material having at least one and preferably both of its opposite surfaces coated with an elastomeric abrasion-resistant material to constitute the basic composite flexible skirt member, and further including electrically conductive means integrated throughout at least a substantial part of said composite skirt member, so as to provide a dissipating electrical discharge grounding path for potential static electrical energy generated in and around said vehicle during operational use more particularly in cold, low humidity environments.

2. The air cushion skirt member of claim 1, wherein said electrically conductive means includes a plurality of electrically conductive flexible strands embedded within said composite skirt member in a predetermined arrangement.

3. The air cushion skirt member of claim 1, wherein said fabric material is woven of synthetic fiber strands such as nylon, and said electrically conductive means includes a plurality of flexible metallic strands or wires interwoven with said synthetic fiber strands.

4. The air cushion skirt member of claim 1, wherein said electrically conductive means includes a multiplicity of semiconductive type fibers such as carbon fibers embedded within said composite sheet material.

5. The air cushion skirt member of claim 1, wherein said electrically conductive means includes electrically conductive particles embedded within at least one of said elastomeric layers in a predetermined generally uniform manner.

6. The air cushion skirt member of claim 1, wherein said elastomeric material is a natural rubber composition having homogeneously formed electrically conductive particles embedded therein to constitute said electrically conductive means integrated therewith.

7. The air cushion skirt member of claim 1, wherein said elastomeric material is a synthetic rubber composition having homogeneously formed electrically conductive particles embedded therein to constitute said electrically conductive means integrated therewith.

* * * * *